(12) United States Patent
Chiou

(10) Patent No.: US 7,222,958 B1
(45) Date of Patent: May 29, 2007

(54) EYEGLASS FRAME WITH REPLACEABLE LENSES

(76) Inventor: Ching-Hae Chiou, P.O. Box 90, Tainan City 70499 (TW)

( * ) Notice: Subject to any disclaimer, the term of this patent is extended or adjusted under 35 U.S.C. 154(b) by 0 days.

(21) Appl. No.: 11/331,144

(22) Filed: Jan. 13, 2006

(51) Int. Cl.
*G02C 1/04* (2006.01)

(52) U.S. Cl. ............... 351/103; 351/106; 351/108

(58) Field of Classification Search ........... 351/41, 351/44, 103–109, 154
See application file for complete search history.

(56) References Cited

U.S. PATENT DOCUMENTS 6,742,890 B1 * 6/2004 Teng .................. 351/86
6,863,395 B1 * 3/2005 Teng .................. 351/103

* cited by examiner

*Primary Examiner*—Huy Mai

(57) ABSTRACT

An eyeglass frame with replaceable lenses comprises an eyeglass frame with a pair of upper support sides and associated insertion recesses and a pair of lenses with associated insertion portions for engaging the insertion recesses. Two temples are pivotally connected to the two lateral sides of the eyeglass frame, each having a front hole for retaining a corresponding block piece. Each of the lenses further includes a notch on the exterior side of the lens under its insertion portion that can be engaged with a corresponding block projection and locked by a corresponding block flange on a corresponding block piece. Therefore, the lenses will be stably mounted on the eyeglass frame. To dissemble the eyeglasses form the eyeglass frame, the temples are folded so that the block pieces are separated from the front holes. The block pieces are pressed, and then the lenses are pushed outward.

2 Claims, 6 Drawing Sheets

EYEGLASS FRAME WITH REPLACEABLE LENSES

FIELD OF THE INVENTION

The present invention relates to eyeglass frames, more particularly to an eyeglass frame with replaceable lenses that can be switched quickly.

BACKGROUND OF THE INVENTION

A pair of eyeglasses that can be replaced easily of the prior art comprises a pair of outer openings opposite to a corresponding boundary mounts that are locked by screw mechanisms to form an eyeglass frame. To replace the lenses, the screw mechanisms are loosened, and the lenses are taken out, which is a time-consuming process. Further, this maneuver needs a tool to unscrew. Therefore, it is inconvenient to replace lenses. It a further disadvantage that the screw mechanisms are easy to get loose, and therefore the lenses are likely to fall on the ground and broken. There is another kind of eyeglass frames, which are plastic integral frame bodies. The installation of lenses to those eyeglass frames need a process of heating the eyeglass frames so as to enlarge them for the insertion of lenses, which is also not convenient to the users.

Therefore, the inventor invents an eyeglass frame with replaceable lenses to remove the above disadvantages.

SUMMARY OF THE INVENTION

The primary objective of the present invention is to provide an eyeglass frame with replaceable lenses that can be dissembled quickly.

To achieve the above objective, an eyeglass frame with replaceable lenses comprises an eyeglass frame and a pair of lenses. The eyeglass frame further comprises a pair of upper support sides each with an insertion recess and a pair of block projections each provided with a block piece having a slope with a block flange. A pair of temples are pivotally connected to the two lateral sides of the eyeglass frame, each having a front hole for retaining a corresponding block piece. Each of the lenses has an insertion portion for engaging a corresponding insertion recess on the eyeglass frame. Each of the lenses further includes a notch on the exterior side of the lens under its insertion portion that can be engaged with a corresponding block projection and locked by a corresponding block flange on a corresponding block piece.

DETAILED DESCRIPTION OF THE PREFERRED EMBODIMENTS

The various objects and advantages of the present invention will be more readily understood from the following detailed description when read in conjunction with the appended drawings.

Figure 1:
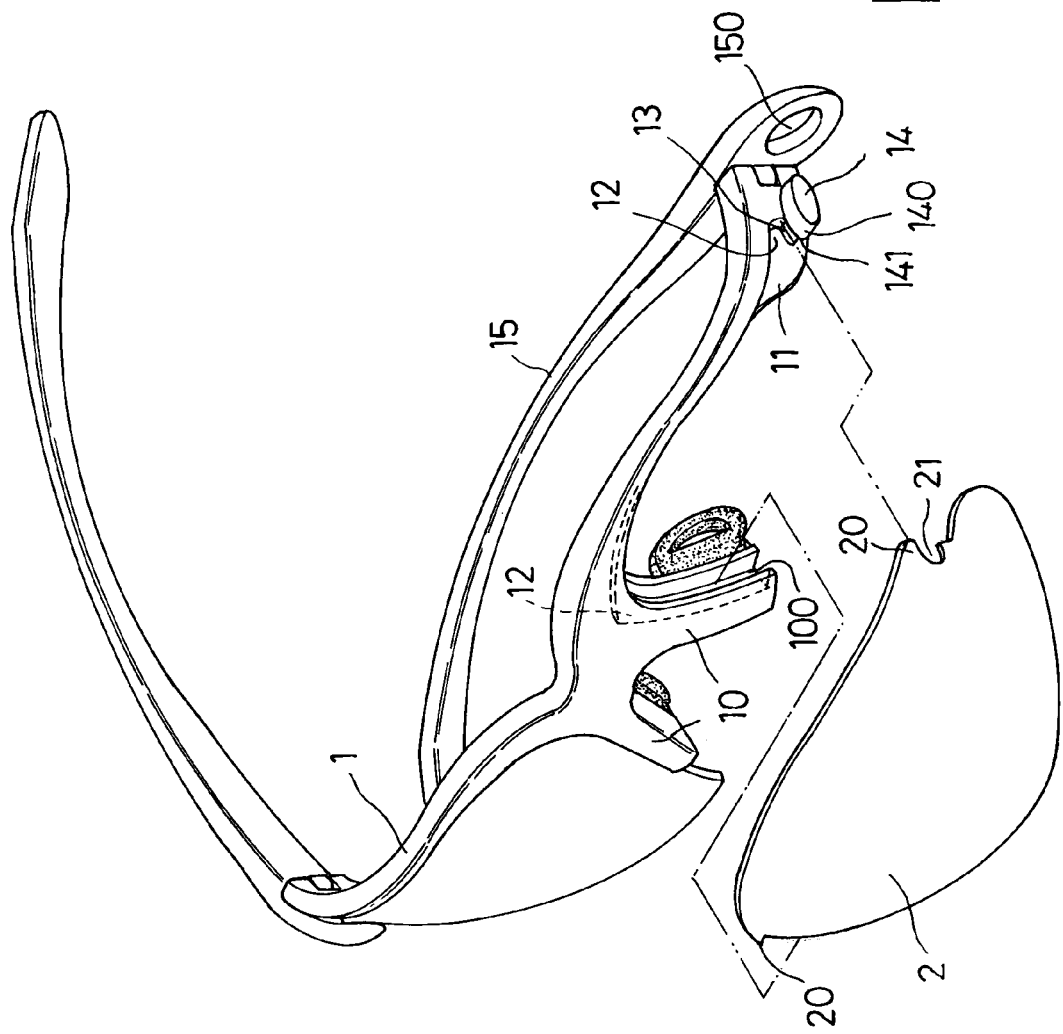
FIG. 1 is an exploded perspective view of an eyeglass frame with replaceable lenses of the present invention.
Figure 2:
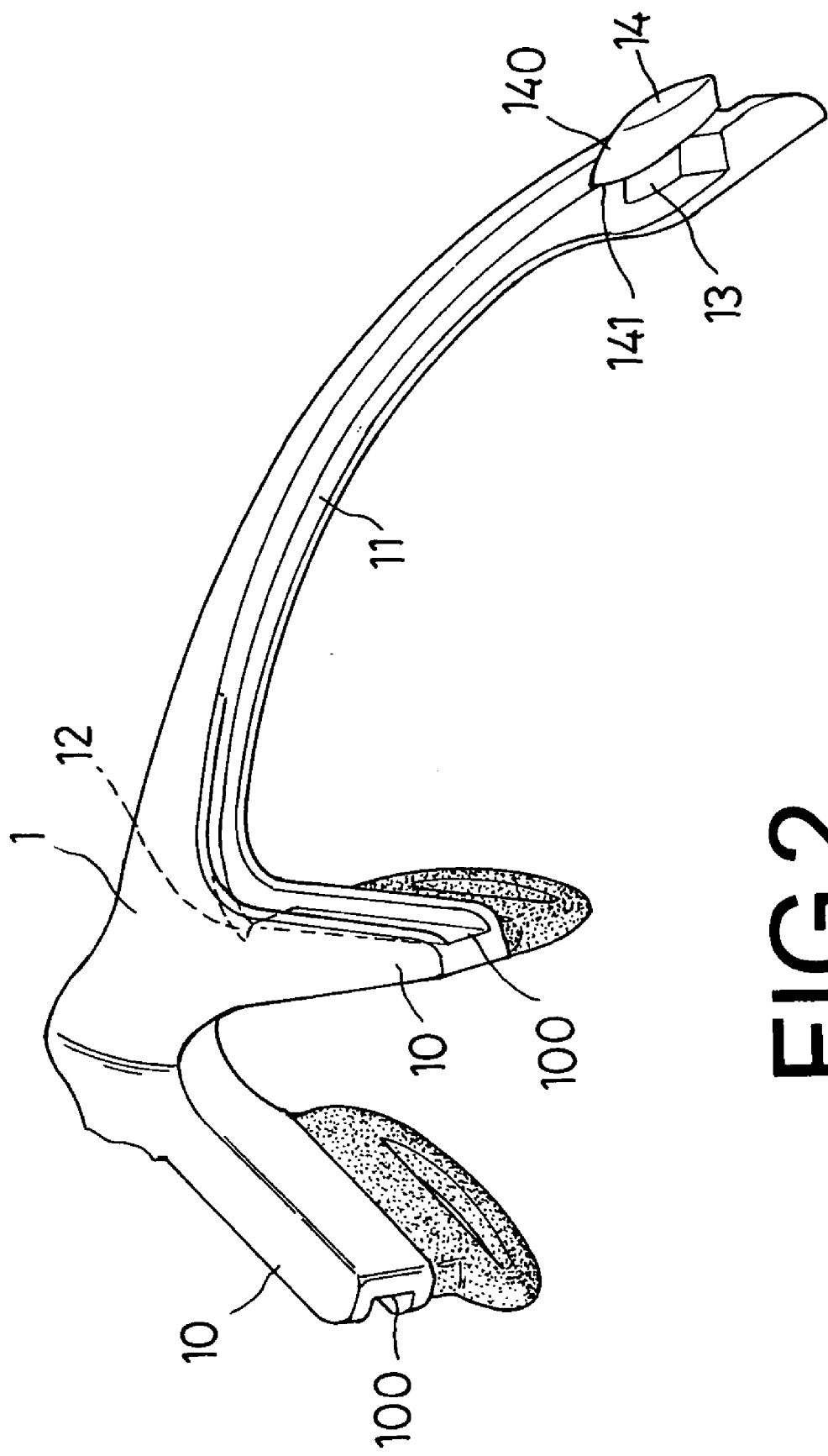
FIG. 2 is a perspective view showing a local structure of the eyeglass frame with replaceable eyeglasses in FIG. 1.
Figure 3:
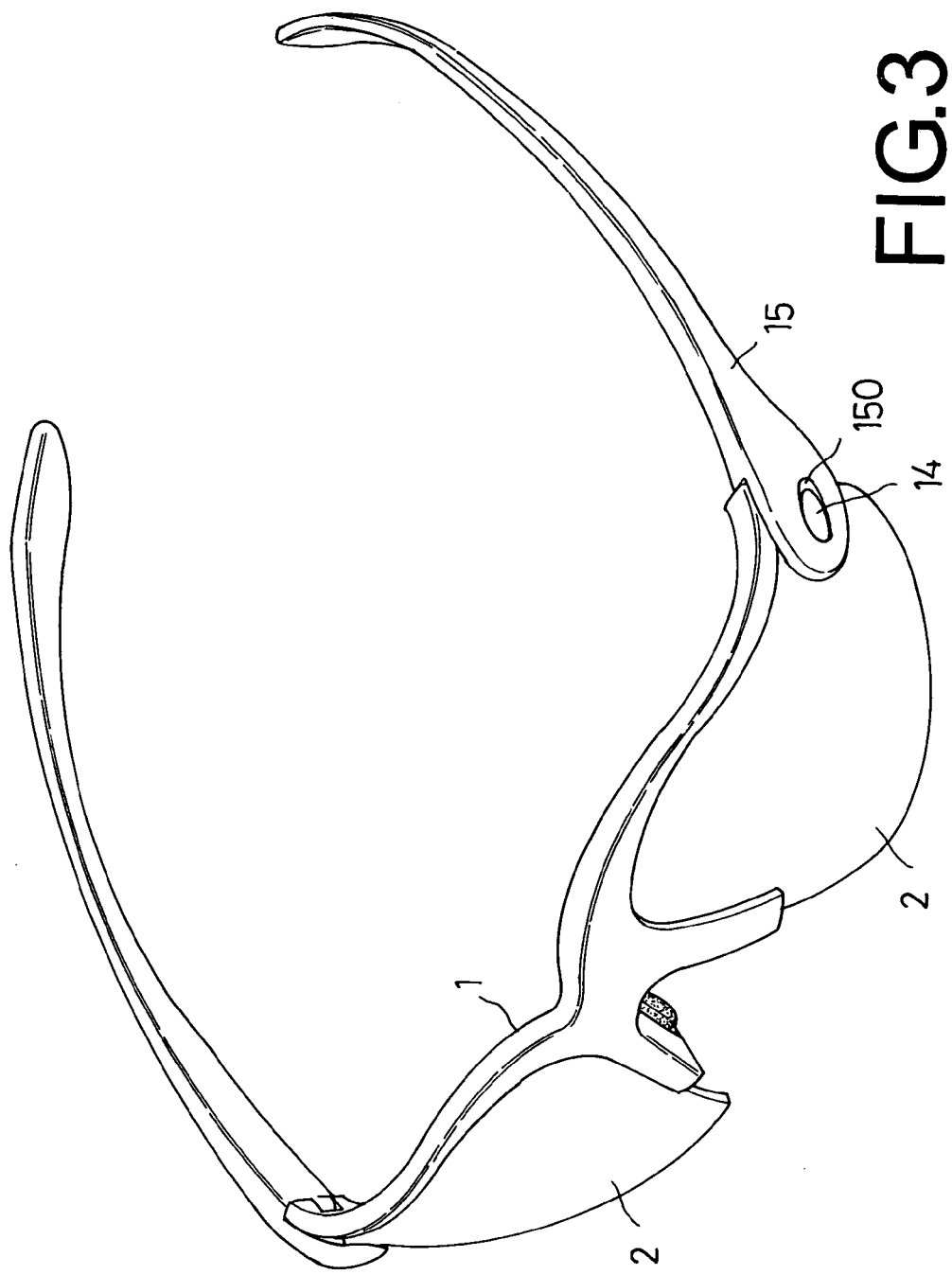
FIG. 3 is a perspective view of the eyeglass frame with replaceable lenses in FIG. 1.
Figure 4:
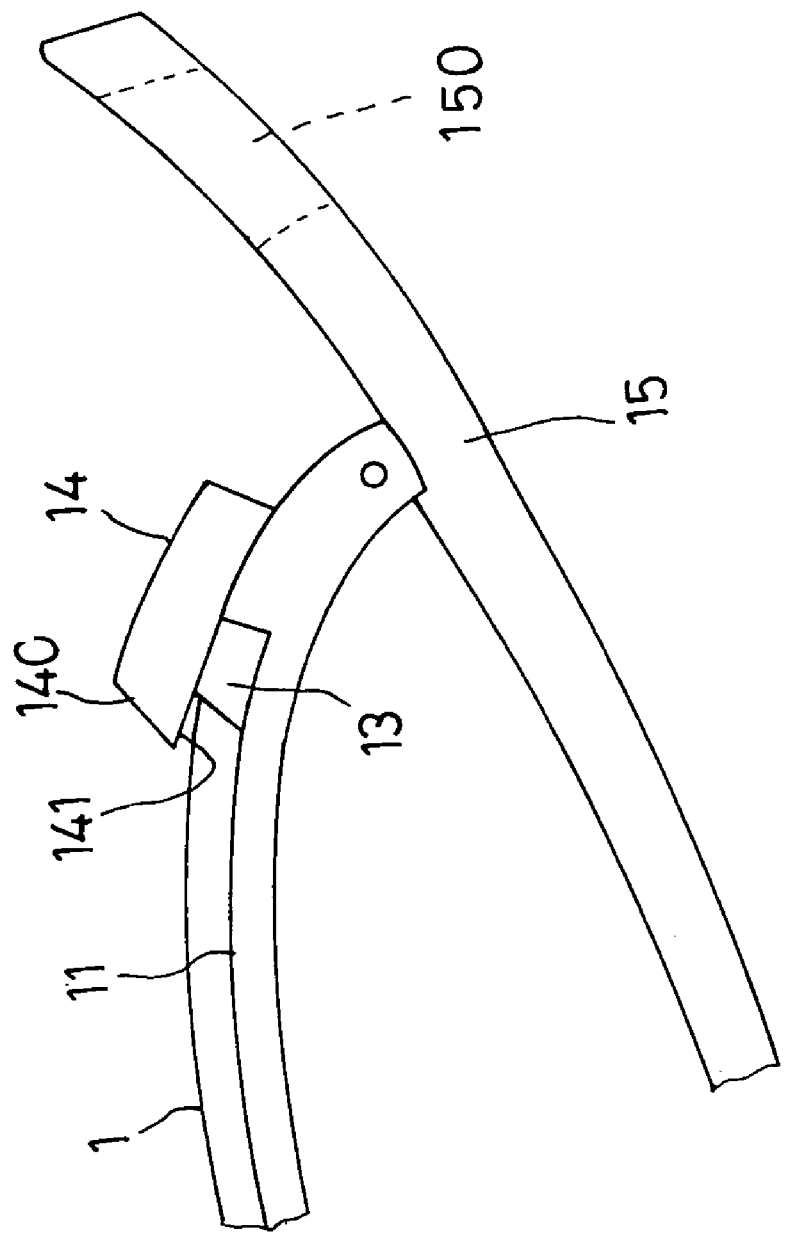
FIG. 4 is a bottom view of a local structure of the eyeglass frame with replaceable lenses in FIG. 1.
Figure 5:
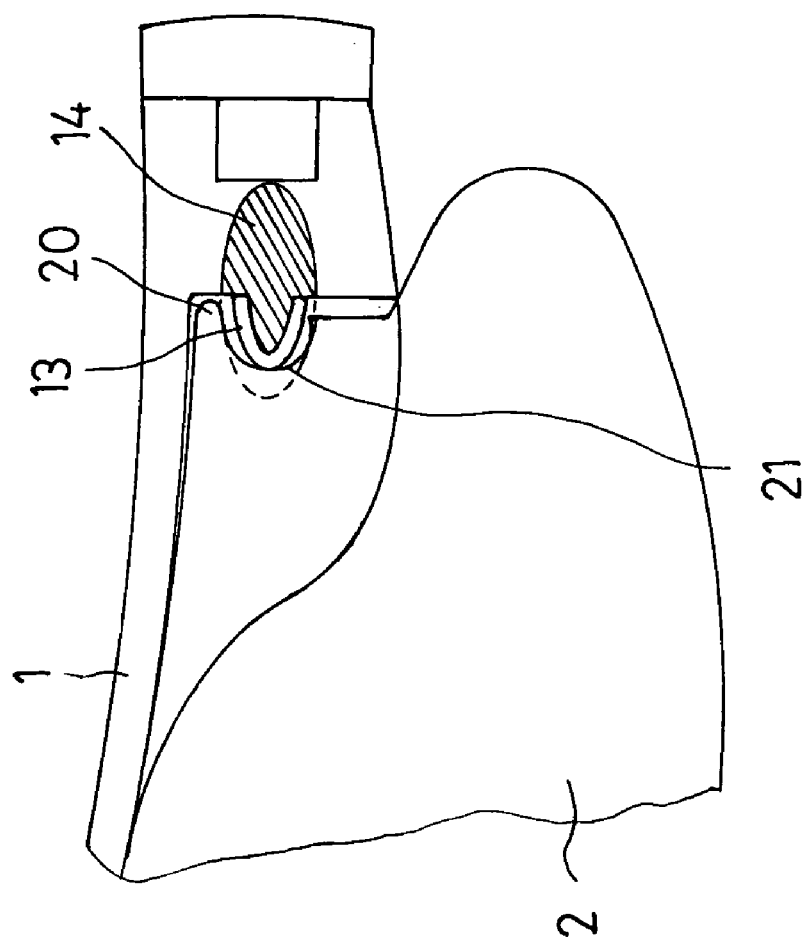
FIG. 5 is a cross-sectional view of a local structure of the eyeglass frame with replaceable lenses in FIG. 1.
Figure 6:
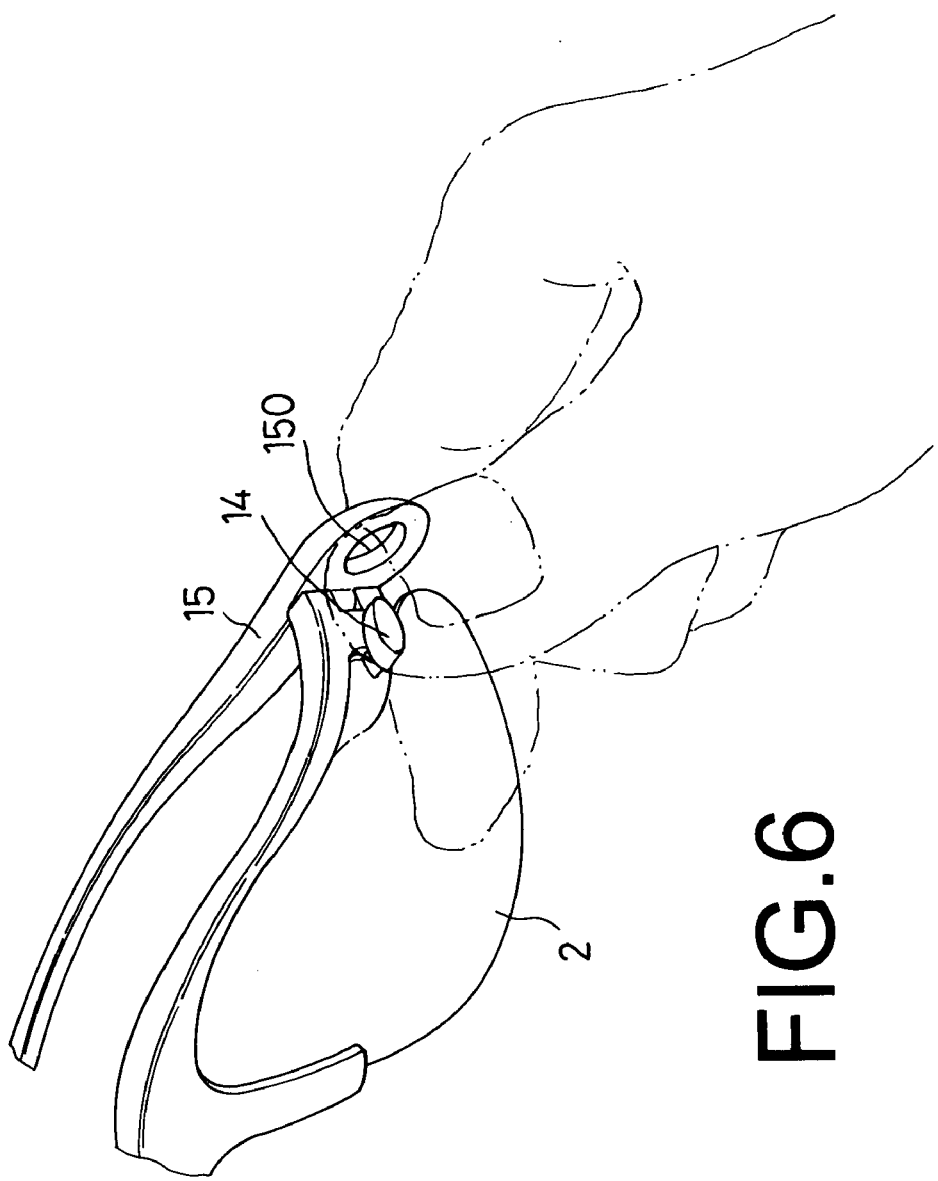
FIG. 6 shows the dissembling operation of the eyeglass frame with replaceable lenses in FIG. 1.

Referring to FIGS. 1 and 2, an eyeglass frame with replaceable lenses according to the present invention comprises an eyeglass frame 1 being a strip-like structure, a pair of lenses 2. The eyeglass frame 1 further comprises a nose-pad portion 10 with retaining grooves 100, a pair of upper support sides 11 each with an insertion recess 12 and a pair of block projections 13 each provided with a block piece 14 having a slope 140 tilted toward the middle of the eyeglass frame 1. Each of the block pieces 14 further includes a block flange 141. A pair of temples 15 are pivotally connected to the two lateral sides of the eyeglass frame 1, each having a front hole 150 for retaining a corresponding block piece 14. Each of the lenses 2 has an insertion portion 20 for engaging a corresponding insertion recess 12 of the eyeglass frame 1. Each of the lenses 2 further includes a notch 21 on the exterior side of the lens 2 under its insertion portion 20 that can be engaged with a corresponding block projection 13 and locked by a corresponding block flange 141 on a corresponding block piece 14.

To assemble the present invention, the lenses 2 are respectively inserted into corresponding retaining grooves 100 on the eyeglass frame 1, whereby the insertion portions 20 are placed within the insertion recesses 12 respectively. The lenses 2 are then pushed upward so as to support against the upper support sides 11 on the eyeglass frame 1. Finally, the notches 21 on the lenses 2 are aligned with block projections 13 and then are locked with the block projections 13 after sliding along the slopes 40 on the block pieces 14. Thereby, the lenses 2 are locked by the block flanges 141 of the block piece 14 and the insertion recesses 12. The temples 15 are then unfolded away from the eyeglass frame 1, whereby the holes 150 at the pivot ends of the temples 15 are eventually retain the block piece 14 of the eyeglass frame 1, and whereby the lenses 2 are thus retained. Therefore, the lenses 2 will be mounted on the eyeglass frame 1 with stability.

The block piece 14 being at an outer side of the eyeglass frame 1; the front hole 150 being correspondent to the block piece. In assembly, the notch 21 is engaged with said block pieces 14 and said front hole receives said block pieces 14 so that said lens 2 is located between said upper supporter sides 11 and said temple 15.

To dissemble the eyeglasses 2 of the present invention form the eyeglass frame 1, the temples 15 are folded so that the block pieces 14 on the eyeglass frame 1 are separated from the holes 150 in front of the temples 15. A thumb is pressed on one of the block pieces 14, and then a corresponding one of the lenses 2 is pushed outward, whereby the notch 21 on the lens 2 will be ejected from the block piece 14. Finally the lens 2 can be taken from the eyeglass frame 1 easily.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An eyeglass frame with replaceable lenses, comprising:

an eyeglass frame with a pair of upper support sides, each of said upper support sides having an insertion recess on a lateral side thereof, a pair of block projections being formed on two opposite outer sides of said eyeglass frame, each of said block projections further including a block piece with a slope and a retaining flange on said slope, said eyeglass frame further comprising a pair of pivotally connected, lateral temples each with a front hole, the block piece being at an outer side of the eyeglass frame; the front hole being correspondent to the block piece; that is, in an assembly state; the block piece being received in the front hole of the lateral temple; and a pair of lenses capable of being engaged with said eyeglass frame each having a notch and an insertion edge corresponding to one of said insertion recesses, each of said notches being engaged with said block pieces on said block projections; and wherein in assembly, the notch is engaged with said block pieces and said front hole receives said block pieces so that said lens is located between said upper supporter sides and said temple.

2. The eyeglass frame with replaceable lenses of claim 1 wherein said eyeglass frame is further provided with a nose-pad portion on an inner side thereon and a pair of retaining grooves above said nose-pad portion.

* * * * *